(12) United States Patent
Xia et al.

(10) Patent No.: US 11,645,909 B2
(45) Date of Patent: May 9, 2023

(54) METHOD, APPARATUS AND ELECTRONIC DEVICE FOR EARLY-WARNING

(71) Applicant: Beijing Baidu Netcom Science and Technology Co., Ltd., Beijing (CN)

(72) Inventors: Deguo Xia, Beijing (CN); Jizhou Huang, Beijing (CN); Hui Zhao, Beijing (CN); Liuhui Zhang, Beijing (CN); Hongxia Bai, Beijing (CN); Yuting Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 295 days.

(21) Appl. No.: 17/034,360

(22) Filed: Sep. 28, 2020

(65) Prior Publication Data

US 2021/0407291 A1 Dec. 30, 2021

(30) Foreign Application Priority Data

Jun. 29, 2020 (CN) .......................... 202010611196.3

(51) Int. Cl.
 *G08G 1/09* (2006.01)
 *G08G 1/0967* (2006.01)
 (Continued)

(52) U.S. Cl.
 CPC ..... *G08G 1/096783* (2013.01); *G08G 1/0116* (2013.01); *G08G 1/052* (2013.01);
 (Continued)

(58) Field of Classification Search
 CPC ........... G08G 1/096783; G08G 1/0116; G08G 1/052; G08G 1/056; G08G 1/164; G08G 1/166; H04W 4/44
 See application file for complete search history.

(56) References Cited

U.S. PATENT DOCUMENTS 10,074,280 B2   9/2018 Bai et al.
10,625,748 B1 * 4/2020 Dong ................ B60W 30/0956
(Continued)

FOREIGN PATENT DOCUMENTS

CN   104240527 A   12/2014
CN   105095869 A   11/2015
(Continued)

OTHER PUBLICATIONS

Extended European Search Report for European application No. 21150020 dated Jun. 11, 2021.
(Continued)

*Primary Examiner* — Peter D Nolan
*Assistant Examiner* — Wae L Louie
(74) *Attorney, Agent, or Firm* — Quinn IP Law PLLC

(57) ABSTRACT

The present disclosure discloses a method, apparatus and electronic device for early-warning, relates to the field of internet of vehicle and used for an intelligent traffic scenario. The specific implementations are: determining a target object crossing a road at a current moment, the road crossed by the target object being a first road; determining a target area based on a location of the target object; determining a target vehicle on the first road based on locations of vehicles on the first road as well as the target area; and sending an early-warning message to the target vehicle. It is using the locations of vehicles on the first road as well as the location of the target object crossing the road to determine the target vehicle during determination of the target vehicle among the vehicles on the first road, in order to send early-warning message to the target vehicle to achieve early-warning of the target vehicle and increase precision of the early-warning.

17 Claims, 5 Drawing Sheets

(51) Int. Cl.
*H04W 4/44* (2018.01)
*G08G 1/01* (2006.01)
*G08G 1/052* (2006.01)
*G08G 1/056* (2006.01)
*G08G 1/16* (2006.01)

(52) U.S. Cl.
CPC ............ *G08G 1/056* (2013.01); *G08G 1/164* (2013.01); *G08G 1/166* (2013.01); *H04W 4/44* (2018.02)

(56) References Cited

U.S. PATENT DOCUMENTS

| | | | |
|---|---|---|---|
| 10,661,795 B1 | 5/2020 | Li et al. | |
| 2011/0087433 A1* | 4/2011 | Yester | G08G 1/096783 701/469 |
| 2015/0035685 A1 | 2/2015 | Strickland et al. | |
| 2015/0035686 A1* | 2/2015 | Frish | G08G 1/07 340/907 |
| 2017/0113686 A1* | 4/2017 | Horita | B60W 30/18163 |
| 2018/0330610 A1* | 11/2018 | Wu | G08G 1/164 |
| 2019/0333378 A1* | 10/2019 | Luzifovich | G08G 1/052 |
| 2020/0409374 A1* | 12/2020 | Dong | G08G 1/0112 |
| 2020/0409912 A1* | 12/2020 | Dong | G06F 16/211 |
| 2021/0095970 A1* | 4/2021 | Lu | G05D 1/0257 |
| 2021/0124355 A1* | 4/2021 | Kirigan | G05D 1/0214 |
| 2021/0407291 A1* | 12/2021 | Xia | G08G 1/0116 |

FOREIGN PATENT DOCUMENTS

| | | |
|---|---|---|
| CN | 105206110 A | 12/2015 |
| CN | 106740838 A | 5/2017 |
| CN | 108039046 A | 5/2018 |
| CN | 108674413 A | 10/2018 |
| CN | 110430401 A | 11/2019 |
| CN | 110588641 A | 12/2019 |
| CN | 110838231 A | 2/2020 |
| CN | 111114514 A | 5/2020 |
| JP | 2003095046 A | 4/2003 |
| JP | 2015032312 A | 2/2015 |
| JP | 2015114931 A | 6/2015 |
| JP | 2019215785 A | 12/2019 |
| WO | 2015156146 A1 | 10/2015 |
| WO | 2018128946 A1 | 7/2018 |

OTHER PUBLICATIONS

First office action for the Chinese application No. 202010611196.3, dated Mar. 22, 2021.
Chinese Office Action for related Chinese application No. CN202010611196.3, dated Jan. 6, 2022.
Japanese Office Action for related Japanese application No. JP2021-042138, dated Jan. 31, 2022.

* cited by examiner

METHOD, APPARATUS AND ELECTRONIC DEVICE FOR EARLY-WARNING

CROSS-REFERENCE TO RELATED APPLICATION

This application claims a priority to Chinese Patent Application No. 202010611196.3 filed on Jun. 29, 2020, the disclosure of which is incorporated in its entirety by reference herein.

TECHNICAL FIELD

The present disclosure relates to the field of internet of vehicle, and specifically to a method, apparatus and electronic device for early-warning.

BACKGROUND

Recently, there are more and more accidents every year due to vehicle blind zone. The blind zone is mainly caused by block of the driver's view; the driver will have no time to react to the pedestrian, non-motor vehicle or motor vehicle that abruptly appears or crosses the road if his/her view is blocked by a heavy vehicle on the driveway beside him or overtaking him by switching lines, which may lead to accidents. It is therefore very important to reduce accidents by detecting the abrupt appearance and crossing of the road of people, non-motor vehicles or motor vehicles and issuing a related warning to the driver so that he/she could adopt an effective avoidance, so as to ensure the safety of life.

SUMMARY

The present disclosure relates to a warning method, apparatus and electronic device.

In a first aspect, the present disclosure provides a warning method, including:
  determining a target object crossing a road at a current moment, the road crossed by the target object being a first road;
  determining a target area based on a location of the target object;
  determining a target vehicle on the first road based on locations of vehicles on the first road as well as the target area; and
  sending an early-warning message to the target vehicle.

The determination of a target vehicle among the vehicles in a first road crossed by a target object after determining the target object crossing the road at the current moment is to early warn the target vehicle only, but not to early warn all of the vehicles on the road crossed by the target object, so as to increase precision of the early-warning. Moreover, it is using the locations of vehicles on the first road as well as the location of the target object crossing the road to determine the target vehicle during determination of the target vehicle among the vehicles on the first road, in order to increase precision of the determination of the target vehicle, send early-warning message to the target vehicle, achieve early-warning of the target vehicle, so as to increase precision of the early-warning.

In a second aspect, the present disclosure provides an early-warning apparatus, including:
  a first determination module for determining a target object crossing a road at a current moment, the road crossed by the target object being a first road;
  a second determination module for determining a target area based on a location of the target object;
  a third determination module for determining a target vehicle on the first road based on locations of vehicles on the first road as well as the target area; and
  a first sending module for sending an early-warning message to the target vehicle.

The determination of a target vehicle among the vehicles in a first road crossed by a target object after determining the target object crossing the road at the current moment is to early warn the target vehicle only, but not to early warn all of the vehicles on the road crossed by the target object, so as to increase precision of the early-warning. Moreover, it is using the locations of vehicles on the first road as well as the location of the target object crossing the road to determine the target vehicle during determination of the target vehicle among the vehicles on the first road, in order to increasing precision of the determination of the target vehicle, sending early-warning message to the target vehicle, achieving early-warning of the target vehicle, so as to increase precision of the early-warning.

In a third aspect, the present disclosure provides an electronic device including:
  at least one processor; and
  a memory in communication with the at least one processor, wherein instructions which can be processed by the at least one processor are stored in the memory such that the at least one processor can carry out the methods provided by various embodiments of the present disclosure by processing the instructions.

In a fourth aspect, an embodiment of the present disclosure further provides a non-transitory computer readable storage medium storing computer instructions, wherein the computer instructions are used for a computer to carry out the methods provided by various embodiments of the present disclosure.

BRIEF DESCRIPTION OF THE DRAWINGS

The attached drawings are provided for better understanding of the present solution in a non-limiting way in which.

DETAILED DESCRIPTION

Exemplified embodiments of the present disclosure are explained hereafter in conjunction with the attached drawings, in which various details of the embodiments of the present disclosure are included merely by way of example to facilitate understanding thereof. The person having ordinary skill in the art should therefore note that various modifications and changes can be made to the embodiments described herein without departing from the scope and spirit of the present disclosure. Also, the description of well-known function and structure is omitted hereafter for clarity and briefness.

Figure 1:
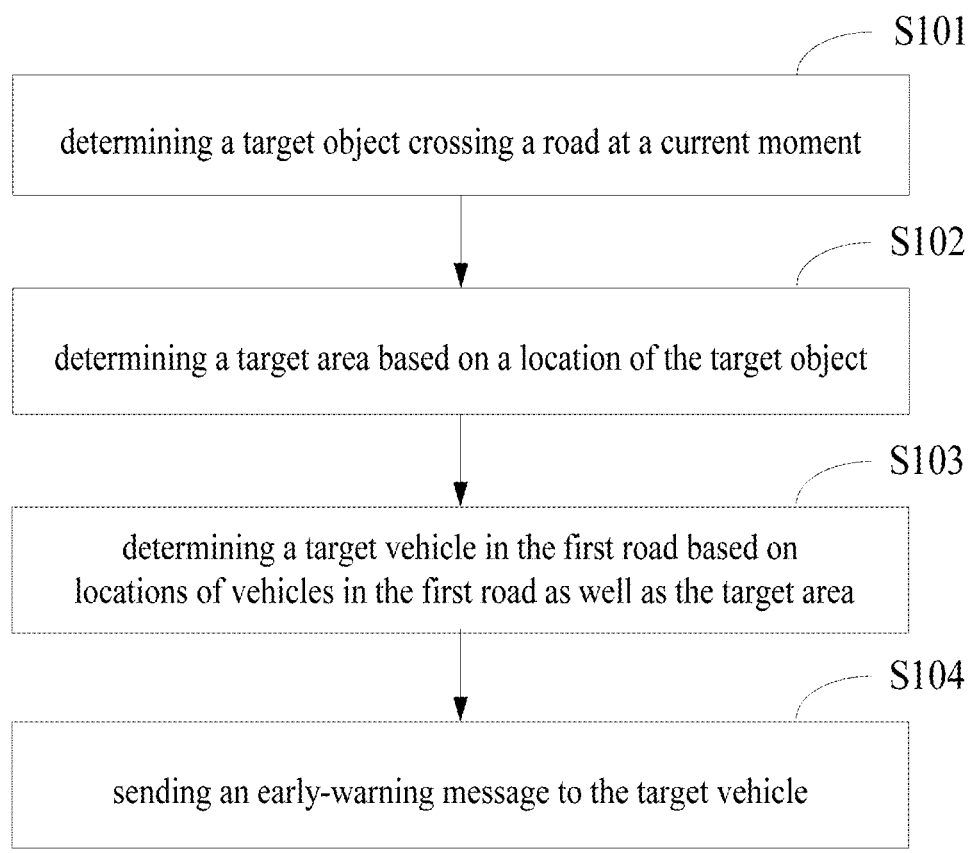
FIG. 1 is a first flow chart schematically illustrating an early-warning method according to an embodiment of the present disclosure.

As shown in FIG. 1, an early-warning method which is applicable for road side devices is provided according to an embodiment of the present disclosure, which includes:

Step S101: determining a target object crossing a road at a current moment.

The early-warning method of the present embodiment is applicable for an intelligent traffic scenario. The target object may be a target pedestrian, a target vehicle (for example a target motor or non-motor vehicle). It is more likely to lead to traffic accidents if a vehicle driver has no time to react to an object (pedestrian, motor or non-motor vehicle) crossing the road since travelling of the vehicle on this road would be affected by the crossing of the object to a certain extent. For driving safety, the early-warning method provided in this embodiment firstly determines a target object crossing a road at the current moment, wherein the road crossed by the target object is a first road, that is to say the road on which the target object is located is the first road.

Step S102: determining a target area based on a location of the target object.

For example, the target area may be an area within the range of a first radius centered on the location of the target object. As an example, the target area may be determined based on location, orientation and speed of the target object so as to link the determined target area to the location, orientation and speed of the target object to increase precision of the target area. The above first radius may be determined by orientation, speed of the target object etc.

Step S103: determining a target vehicle on the first road based on locations of vehicles on the first road as well as the target area.

The first road is crossed by the target object, and the target vehicle which is most affected by the target object crossing the road may be determined among the vehicles on the first road based on the locations of the vehicles on the first road after determining the target area. By setting the target area, the target area is used as the basis of early-warning instead of using the location of the target object as the basis of early-warning, so as to increase the range of target area in comparison with the range of the location of the target object. The range between the target vehicle to be early-warned and the location of the target object crossing the road may therefore be increased to improve driving safety of the vehicle. It should be noted that the target vehicle is a vehicle among the vehicles on the first road which is most affected by and closest to the target object crossing the first road, or the target vehicle is a vehicle among the vehicles on the first road which reaches the target area faster, it takes the target vehicle less time to reach the target area than other vehicles on the first road.

Step S104: sending an early-warning message to the target vehicle.

An early-warning message may be immediately sent to the target vehicle after determining the target vehicle to warn that the target object is crossing the road ahead. As such, the driver of the target vehicle may adopt a preventive measure, etc. depending on the situation.

In the early-warning method according to the present embodiment, the determination of a target vehicle among the vehicles on a first road crossed by a target object after determining the target object crossing the road at the current moment is to early warn the target vehicle only, not to early warn all of the vehicles on the road crossed by the target object, so as to increase precision of the early-warning. Moreover, it is using the locations of vehicles on the first road as well as the location of the target object crossing the road to determine the target vehicle during determination of the target vehicle among the vehicles on the first road, in order to increase precision of the determination of the target vehicle, send early-warning message to the target vehicle, achieve early-warning of the target vehicle, so as to increase precision of the early-warning.

Figure 2:
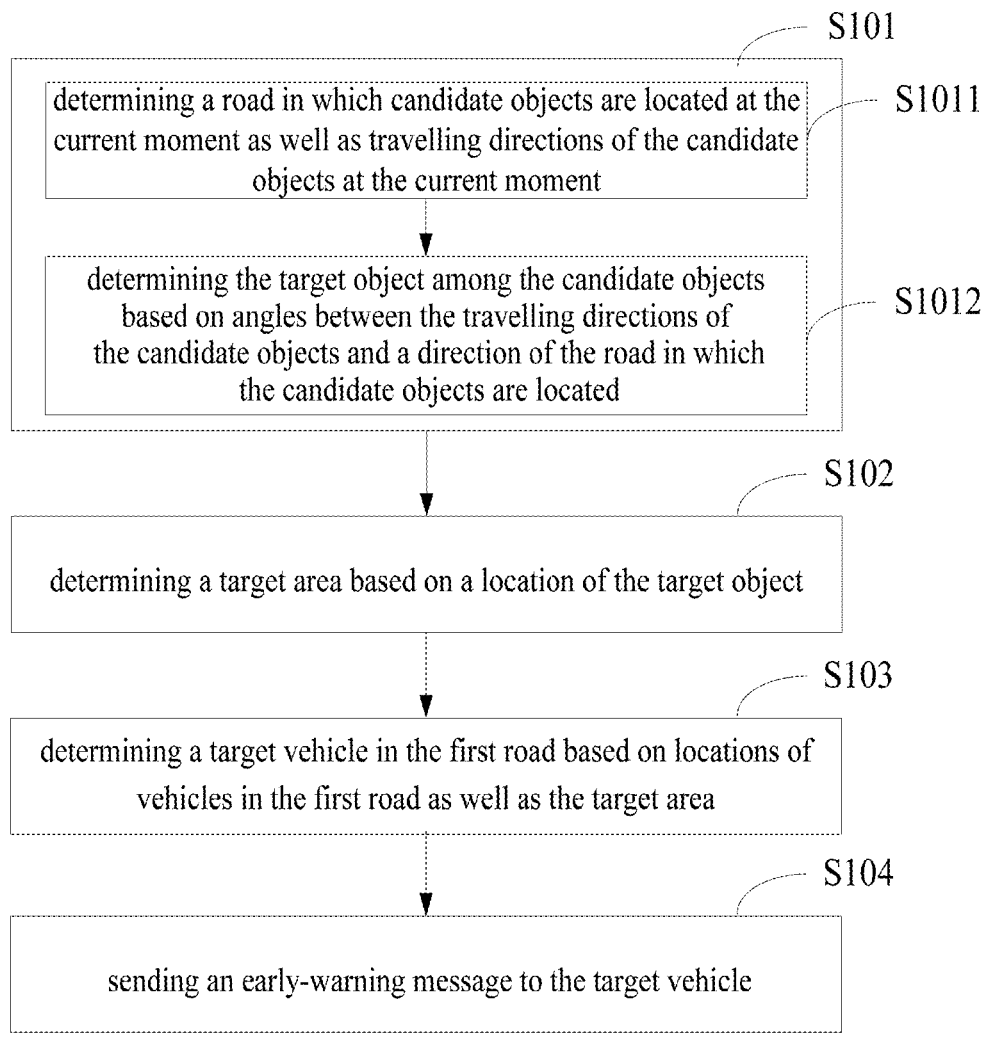
FIG. 2 is a second flow chart schematically illustrating an early-warning method according to an embodiment of the present disclosure.

As shown in FIG. 2, in an embodiment, the step S101 of determining the target object crossing the road at the current moment includes:

S1011: determining a road on which candidate objects are located at the current moment as well as travelling directions of the candidate objects at the current moment.

S102: determining the target object among the candidate objects based on angles between the travelling directions of the candidate objects and a direction of the road on which the candidate objects are located.

The candidate objects at the current moment may be the objects which can be detected by road side devices, for example the candidate object at the current moment may include the objects which can be communicated with the road side devices at the current moment and at a first moment before the current moment, as well as the objects which may be recognized in the images captured by cameras and fulfill a predetermined requirement etc., the predetermined requirement may be that it is recognized in the images captured at the first moment before the current moment. The first moment may refer to a moment carrying out the early-warning method at the last moment before the current moment, the time difference between the first moment and the current moment is a predetermined time interval which may be previously set depending on the actual situation, so as to carry out the early-warning method once at a predetermined time interval, the first moment is thus a moment carrying out the early-warning method before and adjacent to the current moment.

During determination of the target object crossing the road at the current moment, it is firstly to determine the road and travelling directions of the candidate objects, and then determine angles between the travelling directions of the candidate objects and a direction of the road on which the candidate objects are located, so as to determine the target object among the candidate objects based on the angles between the travelling directions of the candidate objects and the direction of the road on which the candidate objects are located to increase precision of the determination of the target object crossing the road. As an example, the target object may be determined by determining whether the angles are within a predetermined angle range, i.e., determine a target object whose angle is within a predetermined angle range among the candidate objects. The predetermined angle range is selected based on historical experience data and may be [60°, 120°].

In an embodiment, determination of the road on which the candidate objects are located at the current moment as well as the travelling directions of the candidate objects at the current moment includes: acquire a first location of a first candidate object at the current moment by means of a V2I communication between vehicles and the road, and acquire a second location of a second candidate object by means of target detection; acquire locations of the candidate objects at the current moment by merging the first location of the first candidate object with the second location of the second candidate object; calculate travelling directions of the candidate objects at the current moment based on the locations of the candidate objects at the current moment as well as locations of the candidate objects at a first moment before and adjacent to the current moment; and determine roads on which the candidate objects are located based on the locations of the candidate objects as well as map data.

The first candidate object at the current moment is an object which can be in V2I communication with road side devices at the current moment and at the first moment as well as been received a location of the first candidate object at the first moment sent by the first candidate object. The first candidate object may send its first location at the current moment to the road side devices by means of V2I communication, and the first candidate object has already sent its location at the first moment to the road side devices by means of V2I communication at the first moment, that is to say the road side devices receive the first location sent by the first candidate object by means of V2I communication and have already received the location sent by the first candidate object itself at the first moment by means of V2I communication.

In addition, a first image at the current moment may be captured by a camera and may be processed by target detection, so as to acquire the location of the second candidate object. As an example, acquire the second location of the second candidate object at the current moment by means of target detection may include: acquire a first image captured by a camera; put object recognition through the first image to determine the first object in the first image as well as its location in the first image; determine a first geographical location of the first object based on the location of the first object in the first image, the location of the camera as well as the camera's internal reference information; determine the second candidate object at the current moment by means of a multi-target tracking model based on the first image, the location of the first object in the first image, a second image captured by the camera at the first moment as well as a location of the second object in the second image, wherein the second object is an object determined by object recognition through the second image, the first object includes the second candidate object and the second object includes the second candidate object; and acquire a second location of the second candidate object, the second location of the second candidate object is a first geographical location thereof.

Merging the first location of the first candidate object with the second location of the second candidate object means get union (combination) of the first location of the first candidate object and the second location of the second candidate object, i.e., the merged candidate objects are results of the union of the first candidate object and the second candidate object, and a corresponding location of an object presented in the first candidate object and the second candidate object is chosen as the first location of the first candidate object.

Then, travelling directions of the candidate objects at the current moment are calculated based on the locations of the candidate objects at the current moment as well as the locations of the candidate objects at the first moment before and adjacent to the current moment, and the roads on which the candidate objects are located is determined based on the locations of the candidate objects as well as map data. For the object among the candidate objects belongs to the second candidate object, the location of this object at the first moment is a second geographical location at the first moment, the second geographical location is a location determined based on the location of this object in the second image, the location of the camera as well as the camera's internal reference information. For the object among the candidate objects belongs to the first candidate object, the location of this object at the first moment is a location of this object acquired by means of V2I communication at the first moment. As an example, the travelling directions of the candidate objects at the current moment may be calculated using the locations of the candidate objects at the current moment, the locations of the candidate objects at the first moment as well as the time difference between the current moment and the first moment.

In the present embodiment, the first location of the first candidate object at the current moment may be acquired by means of V2I communication between the vehicles and the road, and the second location of the second candidate object may be acquired by means of target detection. The locations of the candidate objects at the current moment are acquired by merging the first location of the first candidate object with the second location of the second candidate object, and the travelling directions of the candidate objects at the current moment are calculated using the locations of the candidate objects at the current moment as well as the locations of the candidate objects at the first moment before and adjacent to the current moment, so as to increase precision of the travelling directions.

In an embodiment, the determination of the target area based on the location of the target object includes: determining the target area corresponding to a first predetermined time period based on the location of the target object.

More specifically, the target area corresponding to the first predetermined time period may be determined based on the location, orientation and speed of the target object. The first predetermined time period may be previously set depending on the actual situation, the first predetermined time period may be, for example, but not limited in the present embodiment, 1 second, 3 seconds, 5 seconds etc.

When the target object crossing the first road, there might be some areas corresponding to the case in which some of the vehicles on the first road will reach the position of the target object by a certain period of time, so it is preferred to early-warn the vehicles before they reach these areas some time earlier. Therefore, in the present embodiment, the target area is a target area corresponding to the first predetermined time period determined based on the location of the target object, a target vehicle can be early-warned before it reaches the target area by the first predetermined time period so as to improve driving safety of the vehicle.

Figure 3:
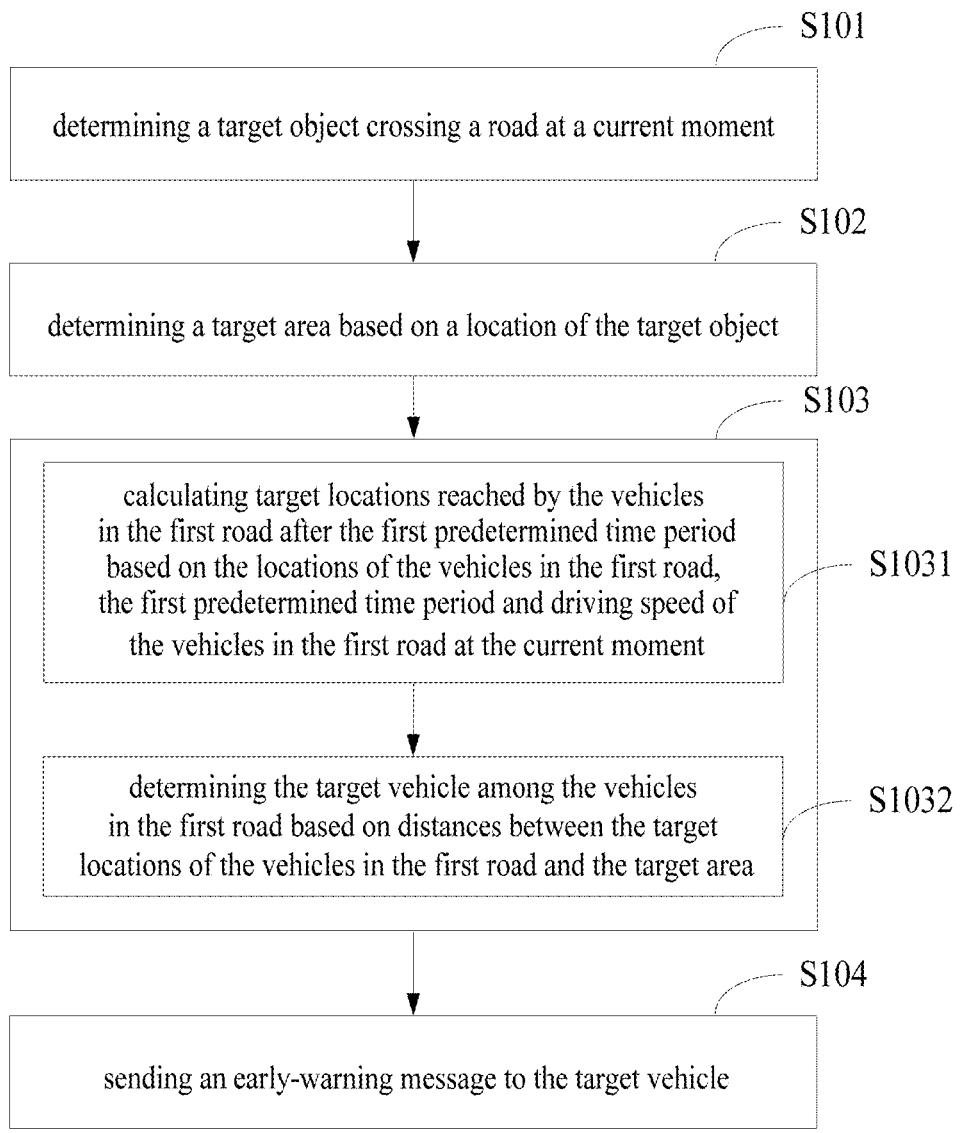
FIG. 3 is a third flow chart schematically illustrating an early-warning method according to an embodiment of the present disclosure.

As shown in FIG. 3, in an embodiment, the step S103 of determining the target vehicle on the first road based on the locations of the vehicles on the first road as well as the target area includes:

S1031: calculating target locations reached by the vehicles on the first road after the first predetermined time period based on the locations of the vehicles on the first road, the first predetermined time period and driving speed of the vehicles on the first road at the current moment.

S1032: determining the target vehicle among the vehicles on the first road based on distances between the target locations of the vehicles on the first road and the target area.

The target vehicle may refer to a vehicle being affected. Determining the target vehicle among the vehicles on the first road using the distances between the target locations (which are reached by the vehicles on the first road after the first predetermined time period based on the locations of the vehicles on the first road at the current moment) and the target area is to increase precision of the target vehicle and thus precision of the early-warning. As an example, it may determine among the vehicles on the first road a target vehicle whose distance between its target location and the target area is less than a predetermined distance, that is to say the distance between the target location of the target vehicle and the target area is less than a predetermined distance, so as to increase precision of the target vehicle and thus precision of the early-warning.

In an embodiment, after determining the target area based on the location of the target object and before sending the early-warning message to the target object, the method further includes: in case of the location of the target object is a junction location and color of traffic light of the first road is not a first predetermined color, or the location of the target object is not the junction location, generating the early-warning message based on the target object and the first predetermined time period.

The first predetermined color is a color for the vehicles to stop, for example, red color. There is generally a traffic light at the junction location, so the case in which the location of the target object is the junction location and color of traffic light of the first road is not the first predetermined color indicates that the target object is crossing the first road at the junction location and the vehicles on the first road are not been instructed to stop. At this time, if the target object, which is not allowed to cross the first road, continues to cross the first road, it may lead to accidents. Therefore, an early-warning message may generated to indicate the target vehicle that there is a target object crossing the road ahead and the target area will be reached by the first predetermined time period, so as to increase precision of the early-warning.

Figure 4:
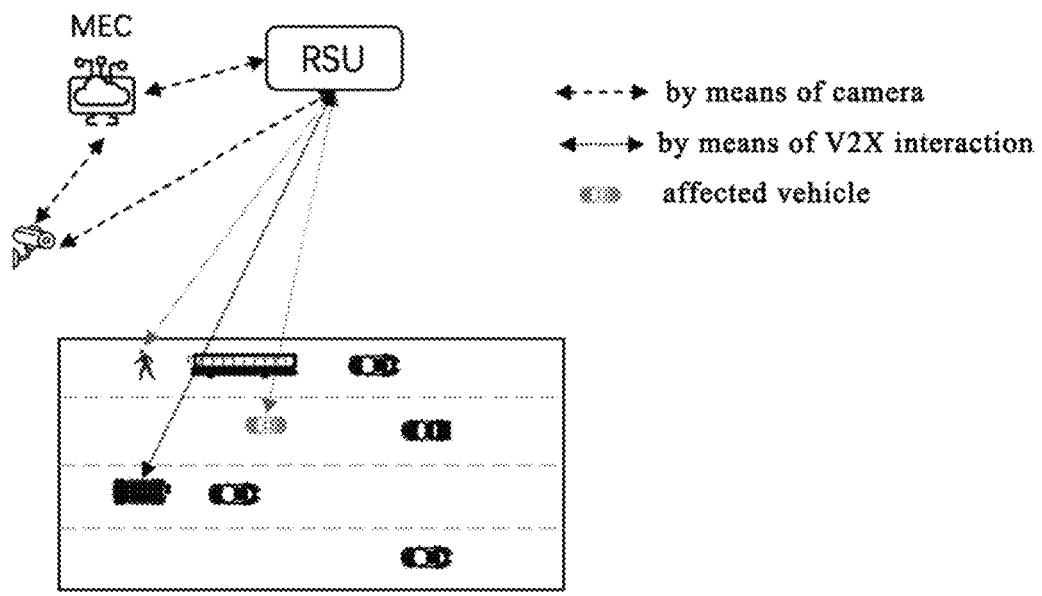
FIG. 4 shows an application scenario of an early-warning method according to an embodiment of the present disclosure.

Steps of the above method will be explained below in specific embodiments with reference to FIG. 4. It should be noted that V2X (Vehicle to Everything), also known as vehicle wireless communication technology, is a new generation information communication technology linking vehicle to everything. Information interactive modes of V2X comprise: V2V (Vehicle to Vehicle), V2P (Vehicle to Pedestrian), V2I (Vehicle to Infrastructure) and V2N (Vehicle to Network).

RSU (Road Side Unit, i.e., road side device) is mounted beside the road, which is a unit that acquires current road conditions, traffic conditions etc., transfers the information to a command center or road side processor unit to process and then transfers corresponding determined information to a vehicle terminal via network so as to assist the driver to drive. It uses DSRC (Dedicated Short Range Communication) or C-V2X (Cellular V2X) technology to communicate with an on board unit.

OBU (On Board Unit) is a hardware device mounted on a vehicle for V2X communication, to enable communication of other vehicle's OBU, a RSU beside the road, a pedestrian with V2X platform. It requires communication network integrated in the OBU, including 4G/5G communication chip and module, LTE-V2X/5G NR-V2X communication chip and module.

In addition, a pedestrian may carry a device in communication with the RSU, for example a wearable device, mobile device etc., to enable communication with the RSU by sending location of the pedestrian to the RSU.

In the present embodiment, steps of the above early-warning method are achieved by an early-warning system including a crossing recognition module, an early-warning generating module, an affected vehicle locating module and an early-warning interactive module.

The crossing recognition module firstly recognizes objects. One way is that the RSU may interact with the objects (pedestrians, non-motor vehicles or motor vehicles) by means of V2I communication to acquire current moment $t_0$ and object's location $L_{t_0}$, based on V2I recognition.

The other way is accessing real-time videos to mobile edge computation nodes (MEC) via a 5G network based on visual recognition technology, i.e., road side cameras, the mobile edge computation nodes perform target tracking. Specific processes thereof are as follow.

First, recognizing different objects and locations thereof in an image by means of image recognition.

Recognizing presence of objects in an image and corresponding locations thereof based on a pre-trained deep neural network. Specifically, a target detection framework such as Faster-RCNN, YOLO and SSD etc. may be adopted, and it is using Faster-RCNN as the detection framework in the present embodiment. A model is trained based on marked samples as well as the chosen deep network to obtain a recognition model enables subdivide of the objects (pedestrians, non-motor vehicles or motor vehicles). Specifically, the deep neural network may be selected from the model types of ResNet, Inception, for example, it is chosen ResNet network as the recognition model in the present embodiment. Current moment $t_0$ and location of the objects $L_{t_0}$ are then obtained by means of visual recognition based on the location information of the detected objects in the image as well as location and internal reference information of the road side cameras.

Second, tracking targets by means of multi-target tracking.

Sequence images are extracted by video data of the road side cameras and location information of different objects is manually marked out in the sequence images, the samples are then trained using a multi-target tracking model based on deep learning such as Deep Sort model. For the video data of the road side cameras, objects included in each frame of the image are detected using the recognition model, then trajectory information of each of the objects are predicted using the Deep Sort model.

Specifically, for example, there will be no tracking and calculating if the current moment t is an initial moment. In case of the moment t is not an initial moment, based on an image $A_{t_1}$ at a last moment $t_1$, positions of objects $P_{t_1,1}$, $P_{t_1,2}$ and $P_{t_1,3}$ in the image $A_{t_1}$ may be obtained, and thus actual geographical locations $S_{t_1,1}$, $S_{t_1,2}$ and $S_{t_1,3}$ are obtained. Based on the image $A_{t_1}$ at the moment $t_1$, the positions of the objects $P_{t_1,1}$, $P_{t_1,2}$ and $P_{t_1,3}$ in the image $A_{t_1}$, an image $A_{t_0}$ corresponding to the current moment $t_0$ as well as objects $P_{t_0,1}$ and $P_{t_0,2}$ recognized in the image $A_{t_0}$, if $P_{t_1,2}$ and $P_{t_0,1}$ are determined as the same object via the multi-target tracking model, the object then becomes a second candidate object which actual location at the moment $t_1$ is $S_{t_1,2}$ and actual location at the current moment $t_0$ is $S_{t_0}$.

Further, for the calculation of speed, locations of each of the objects at the current moment $t_0$ and the moment $t_1$ may be obtained based on the above two ways, such that it is possible to calculate travelling direction $d_{t_0}$ and speed $v_{t_0}$ of the object at the current moment.

Moreover, it is possible to acquire a road L on which the objects are positioned based on $L_{t_0}$ and map data. Angles θ between travelling directions of the objects and direction of the road may be calculated based on the travelling directions of the objects and the direction of the road, it is considered that the objects are crossing the road L if their angles are within a certain range such as [60°, 120°], such that these objects are target objects.

For the early-warning module, an early-warning is generated based on the following ways for the target objects being considered as crossing the road L.

Based on the crossing location, if this location is at a junction and traffic light is red at the current road, there will be no early-warning message generated. If this location is not at the junction and the traffic light is not red, an affected area $R_w$ within a certain time period t (such as 5 seconds) is then generated based on current locations, orientations as well as speeds of the target objects.

The early-warning message is generated based on the current moment $t_0$, the target objects, the time period t as well as the area $R_w$. In case that the target object is pedestrian and t is 5 seconds, the early-warning will be "$t_0$, $R_w$, pedestrian, 5 seconds, early-warning message". The early-warning message may be generated through a template such as "pedestrian is crossing the road ahead, ETA 5 seconds reaching driving area".

For the affected vehicle locating module, at the moment $t_0$, set of all of the vehicles accessed in the current RSU is $C=\{C_1, C_2, \ldots, C_n\}$, in which n is the number of the vehicles which is a positive integer. For any one vehicle $C_i$ in the set C (the $i^{th}$ vehicle in the set C), $1 \leq i \leq n$ in which i is a positive integer. The RSU is enable to acquire the information such as current location $L_{i,t_0}$, orientation $d_{i,t_0}$, speed $v_{i,t_0}$ and so forth of the vehicle $C_i$ through V2I. It is determined whether a vehicle is running on the road L based on its location, orientation as well as map data. For a vehicle running on the road L, using the formula $L_{i,t}=L_{i,t_0}+v_{i,t_0} \times t$ in combination with the above information to calculate the target location $L_{i,t}$ reached by the vehicle $C_i$ after a certain time period t.

If distance of the target location to the affected area in which pedestrian, non-motor vehicle and motor vehicle is crossing the road or abrupt appearing is within a certain threshold, the vehicle $C_i$ is then an affected vehicle, it is thereby possible to obtain an affected vehicle set $\tilde{C}$, i.e., target vehicles.

For the early-warning interactive module, for each vehicle $\tilde{C_j} \in \tilde{C}$ in which $\tilde{C_j}$ is the $j^{th}$ vehicle in $\tilde{C}$ and j is a positive integer, the RSU sends the early-warning message generated by the early-warning generating module to the OBU of the vehicle $\tilde{C_j}$ by means of V2I interaction, and the OBU warns the driver by broadcasting an early-warning message.

The RSU detects whether pedestrians, non-motor vehicles or motor vehicles abrupt appear or cross the road, locates the affected areas and generates early-warning messages. Information such as vehicle location and speed etc. are obtained by the interaction between RSU and OBU. Affected vehicles are determined based on the affected areas and vehicle information. The early-warning messages are sent to the affected vehicles by the interaction between RSU and OBU to warn the drivers adopt an effective avoidance in time.

In the present solution, by the combination of V2X with 5G and edge computation, it is possible to recognize the abrupt appearance of pedestrian, non-motor vehicle or motor vehicle more comprehensively and faster, so as to provide a more prompt early-warning. V2X provides an over-the-horizon communication capability with low latency and high reliability. Based on V2X interaction, by acquiring the real time information of locations, travelling direction as well as speed of pedestrians, non-motor vehicles or motor vehicles, it is possible to recognize the abrupt appearance of pedestrians, non-motor vehicles or motor vehicles in time. For the objects cannot interact with V2X, real time videos are accessed to mobile edge computation nodes via 5G network based on road side surveillance cameras and on board cameras, and the mobile edge computation nodes recognize the abrupt appearance of pedestrians, non-motor vehicles or motor vehicles by means of visual detection technology. 5G network has advantages of low latency and high concurrent, which, in combination with an MEC deployment, is possible to deploy a visual algorithm model in advance to form a localized and short-distance deployment, so as to reduce time consumption during transmission of data in the network. By combine V2X with the visual detection based on 5G and edge computation, it is provided a more comprehensively and faster recognition of the abrupt appearance of pedestrians, non-motor vehicles or motor vehicles, so as to provide a more prompt early-warning to the drivers.

In addition, it is possible to obtain a more precise locating of affected vehicles based on V2X, to reduce interference caused by false alarm. By means of the intersection of RSU with OBU, it is possible to acquire information of locations, orientations and speeds etc. of all the vehicles accessed to the current RSU, and areas which will be reached by the vehicles within a certain time period can be determined based on the information. If distances between the areas and an affected area in which crossing of the road or abrupt appearance of pedestrians, non-motor vehicles or motor vehicles is detected does not go beyond a certain threshold, those vehicles are then the affected vehicles. In this way, it is possible to more precisely locate the affected vehicles and reduce panic of other vehicle drivers caused by undifferentiated early-warnings.

Figure 5:
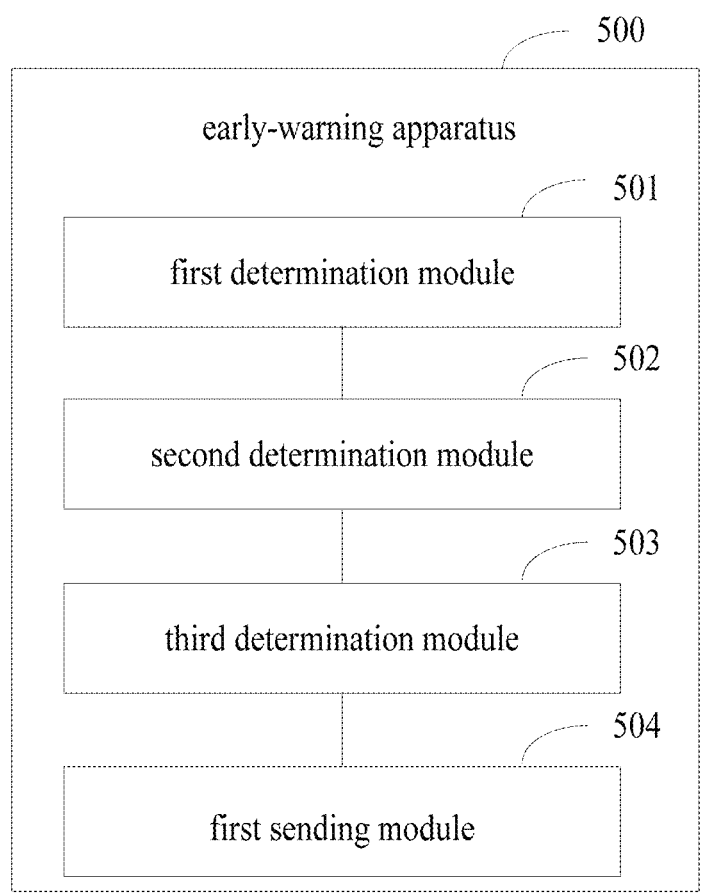
FIG. 5 is a first structure view illustrating an early-warning apparatus according to an embodiment of the present disclosure.

With reference to FIG. 5, the present disclosure provides an early-warning apparatus 500 according to an embodiment which is applicable to road side devices, including:

a first determination module 501 for determining a target object crossing a road at a current moment, the road crossed by the target object being a first road;

a second determination module 502 for determining a target area based on a location of the target object;

a third determination module 503 for determining a target vehicle on the first road based on locations of vehicles on the first road as well as the target area; and a first sending module 504 for sending an early-warning message to the target vehicle.

Figure 6:
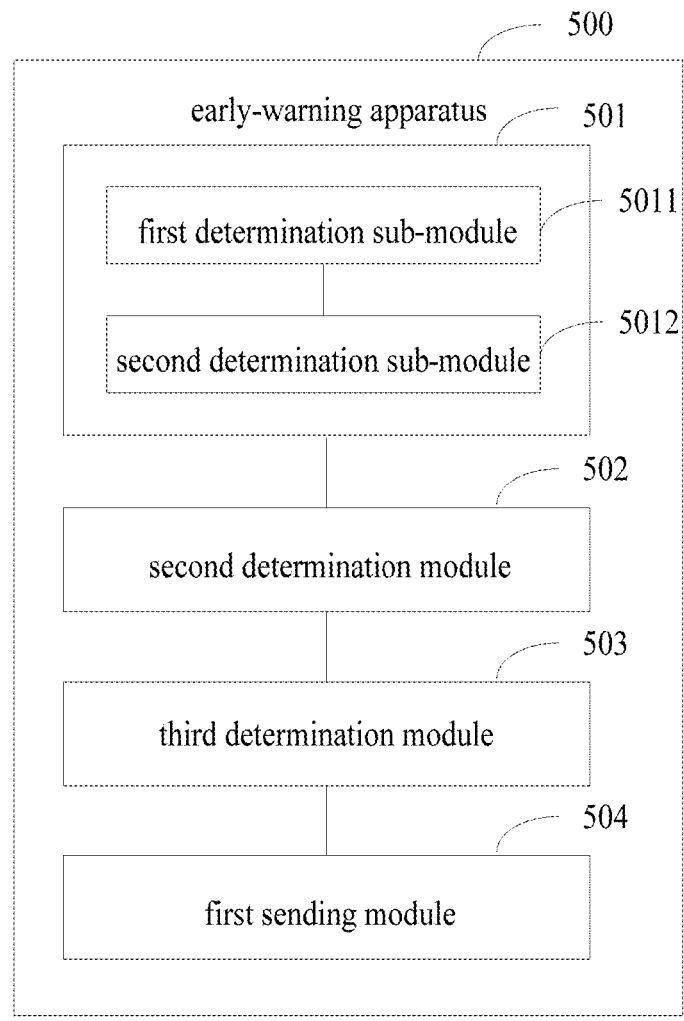
FIG. 6 is a second structure view illustrating an early-warning apparatus according to an embodiment of the present disclosure.

With reference to FIG. 6, the first determination module 501 according to an embodiment includes:

a first determination sub-module 5011 for determining a road on which candidate objects are located at the current moment as well as travelling directions of the candidate objects at the current moment; and a second determination sub-module 5012 for determining the target object among the candidate objects based on angles between the travelling directions of the candidate objects and a direction of the road in which the candidate objects are located.

In an embodiment, the first determination sub-module includes:

a location acquiring module for acquiring a first location of a first candidate object at the current moment by means of a V2I communication between vehicles and the road, and acquiring a second location of a second candidate object by means of target detection;

a merging module for acquiring locations of the candidate objects at the current moment by merging the first location of the first candidate object with the second location of the second candidate object;

a calculation module for calculating travelling directions of the candidate objects at the current moment based on the locations of the candidate objects at the current moment as well as locations of the candidate objects at a first moment before and adjacent to the current moment; and a road determination module for determining roads in which the candidate objects are located based on the locations of the candidate objects as well as map data.

In an embodiment, determining the target area based on the location of the target object includes: determining the target area corresponding to a first predetermined time period based on the location of the target object.

In an embodiment, the third determination module includes:

a target location calculation module for calculating target locations reached by the vehicles on the first road after the first predetermined time period based on the locations of the vehicles on the first road, the first predetermined time period and travelling speed of the vehicles on the first road at the current moment; and a target vehicle determination module for determining the target vehicle among the vehicles on the first road based on distances between the target locations of the vehicles on the first road and the target area.

In an embodiment, the apparatus further includes a warning message generating module for generating the early-warning message based on the target object and the first predetermined time period in case of the location of the target object is a junction location and color of traffic light of the first road is not a first predetermined color, or the location of the target object is not the junction location.

The early-warning apparatus according to the above embodiments is an apparatus for implementing the method according to the above embodiments and with technical features and effects corresponding to the latter, so that will not be reiterated hereafter.

According to embodiments of the present disclosure, it is also provided an electronic device and a readable storage medium.

Figure 7:
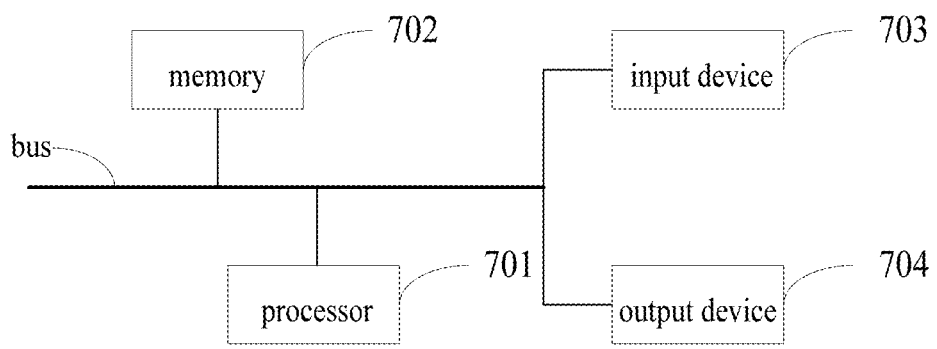
FIG. 7 is a block diagram illustrating an electronic device for implementing early-warning methods according to embodiments of the present disclosure.

FIG. 7 shows a block diagram of an electronic device for implementing early-warning methods according to embodiments of the present disclosure. The electronic device refers to various types of digital computer, for example laptop, desktop computer, working table, personal digital assistant (PDA), server, blade server, mainframe computer or other suitable computers. The electronic device may also be various types of mobile device, for example personal digital processor, cell phone, smart phone, wearable device or other similar computing devices. The components, connections and relationships therebetween as well as functions thereof are only illustrated herein by way of example, and are not intended to limit the implementations of the present disclosure described and/or claimed herein.

As shown in FIG. 7, the electronic device includes at least one processor 701, a memory 702 and interfaces to be connected to various components including high-speed and low-speed interfaces. Respectively components are interconnected via different buses and may be mounted on a common mainboard or mounted in other ways as needed. The processor may process the instructions carried out in the electronic device, including the instructions stored in or on the memory for displaying GUI graphic information on external input/output devices (such as display devices coupled to the interfaces). In other embodiments, if needed, it is possible to cooperate multiple processors and/or buses with multiple memories. It is also possible to connect multiple electronic devices, each of them provides necessary function (for example served as a server array, a set of blade servers or a multi-processor system). As an example, FIG. 7 shows one processor 701.

The memory 702 is the non-transitory computer readable storage medium of the present disclosure, wherein instructions can be carried out by the at least one processor are stored in the memory, such that the at least one processor is enable to carry out the early-warning method provided by the present disclosure. The non-transitory computer readable storage medium of the present disclosure stores computer instructions, the latter are used for carrying out the early-warning method provided by the present disclosure by means of computer.

The memory 702, as a non-transitory computer readable storage medium, is enable to store non-transitory software programs, non-transitory computer executable programs and modules, such as the program instructions/modules corresponding to the early-warning method of the present embodiments (for example, the first determination module 501, the second determination module 502, the third determination module 503 and the first sending module 504). The processor 701 runs the non-transitory software programs, instructions and modules stored in the memory 702 to carry out various function applications and data processes of the server, i.e. to implement the early-warning method according to the above embodiments.

The memory 702 may comprise a program storage section and a data storage section, in which the program storage section may store applications required by the operating system and at least one function; the data storage section may store the data established by the use of the electronic devices based on keyboard display etc. In addition, the memory 702 may include high-speed random-access memory and also non-transitory memory such as at least one disk storage device, flash memory device or other non-transitory solid state memories. In some embodiments, the memory 702 may include memories remotely arranged in relation to the processor 701, these remote memories may be connected to keyboard display electronic devices via network. Examples of said network include, but not limited to, internet, intranet, local area network, mobile communication network or the combination thereof.

The electronic device of the early-warning method may also comprise an input device 703 and an output device 704. The processor 701, memory 702, input device 703 and output device 704 may be connected by buses or others, and FIG. 7 shows a bus connection as an example.

The input device 703 is enable to receive inputted digital or character information as well as generating key signal inputs related to user settings and function controls of keyboard display electronic devices, which is for example touch screen, keypad, mouse, trackpad, touch pad, indicator bar, one or more mouse buttons, trackball, joystick or other input devices. The output device 804 may include display device, auxiliary lighting device (for example LED) and tactile feedback device (for example vibration motor) etc. The display device includes, but not limited to liquid crystal display (LCD), light emitting diode (LED) display and plasma display. In some embodiments, the display device may be a touch screen.

The embodiments of system and technology described herein may be implemented in digital electronic circuit system, integrated circuit system, exclusive ASIC (Application Specific Integrated Circuit), computer hardware, firmware, software and/or combination thereof. These embodiments may be implemented in one or more computer programs; the one or more computer programs may be carried out and/or interpreted on a programmable system includes at least one programmable processor. The programmable processor may be an exclusive or versatile programmable processor which is able to receive data and instructions from the storage system, at least one input device and at least one output device as well as transfer the data and instructions to the storage system, at least one input device and at least one output device.

Said computer programs (also called program, software, software application or code) include machine instructions of the programmable processor and are enable to implement these computer programs using procedure and/or object-oriented programming language, and/or assembly and/or machine language. As used herein, the terms "machine readable medium" and "computer readable medium" refer to any computer program products, apparatuses and/or devices (for example disk, compact disc, memory or programmable logic device (PLD)) for providing machine instructions and/or data to the programmable processor, which include machine readable medium for receiving machine instructions served as machine readable signals. The term "machine readable signal" refers to any signals for providing machine instructions and/or data to the programmable processor.

To provide intersection with the user, the system and technology described herein may be implemented on a computer which includes: a display device for displaying information to the user (for example, CRT (cathode-ray tube) or LCD (liquid crystal display) monitor); and a keyboard and pointing device (for example mouse or trackball), through which the user is enable to provide inputs to the computer. Other types of devices may also be used to provide the intersection with the user. For example, feedbacks provided to the user may be any types of sensory feedbacks (such as visual feedback, acoustic feedback, or tactile feedback), and may receive inputs from the users in many ways (including acoustic input, voice input or tactile input).

The system and technology described herein may be implemented in a computer system includes backstage components (such as served as a data server) or a computer system includes intermediate components (such as application server) or a computer system includes front end components (such as user computer has a graphic user interface or web browser, by means of which the users may interact with the embodiments of the system and technology described herein) or a computer system includes any combinations of said backstage components, intermediate components and front end components. Components of the system may be interconnected via any types or mediums of digital data communications (for example a communication network). Examples of the communication network comprise local area network (LAN), wide area network (WAN) and internet.

The computer system may comprise client and server. The client and server are generally spaced apart from each other and generally being intersected through a communication network. Relationships between the client and server are generated through the running on respective computers as well as computer programs having client-server relationships.

According to the technical solutions of the present embodiments, after determining the target objects crossing the road at the current moment, target vehicles has to be determined among the vehicles on the first road crossed by the target objects, so as to early warn the target vehicles only, but not to early warn all of the vehicles on the first road crossed by the target objects, therefore increase precision of the early-warning. Also, it is using the locations of vehicles on the first road as well as locations of the target objects crossing the road to determine the target vehicles during determination of the target vehicles among the vehicles on the first road, in order to increase precision of the determination of the target vehicles, send early-warning message to the target vehicles, achieve early-warning of the target vehicles, so as to increase precision of the early-warning.

It should be understood that various procedures illustrated above may be reordered, added or canceled. For example, individual steps described in the present disclosure may be carried out in parallel or in sequence or be carried out in different orders, as long as it is possible to obtain the desired result of the technical solution disclosed in the present disclosure, which is not limited herein.

The above specific embodiments are not intended to limit the protection scope of the present disclosure. The person having ordinary skill in the art should note that any modifications, combinations, sub-combinations and alternations are possible based on the design requirement and other factors. Any modifications, equivalents and improvements etc. within the spirit and principle of the present disclosure shall all be included in the protection scope thereof

What is claimed is:

1. An early-warning method, comprising:
    determining a target object crossing a road at a current moment, the road crossed by the target object being a first road;
    determining a target area based on a location of the target object;
    determining a target vehicle on the first road based on locations of vehicles on the first road as well as the target area; and
    sending an early-warning message to the target vehicle,
    wherein the determining the target area based on the location of the target object comprises:
    determining the target area corresponding to a first predetermined time period and having the location of the target object as a center of the target area, on the basis of the location of the target object, and
    wherein the determining the target vehicle on the first road based on locations of vehicles on the first road as well as the target area comprises:
    determining the target vehicle out of respective vehicles on the first road and within the target area, on the basis of locations of the respective vehicles on the first road as well as the target area.

2. The method according to claim 1, wherein determining the target object crossing the road at the current moment comprises:
    determining a road on which candidate objects are located at the current moment as well as travelling directions of the candidate objects at the current moment; and
    determining the target object among the candidate objects based on angles between the travelling directions of the candidate objects and a direction of the road on which the candidate objects are located.

3. The method according to claim 2, wherein determining the road on which the candidate objects are located at the current moment as well as travelling directions of the candidate objects at the current moment comprises:
    acquiring a first location of a first candidate object at the current moment by means of a V2I communication between vehicles and the road, and acquiring a second location of a second candidate object by means of target detection;

acquiring locations of the candidate objects at the current moment by merging the first location of the first candidate object with the second location of the second candidate object;

calculating travelling directions of the candidate objects at the current moment based on the locations of the candidate objects at the current moment as well as locations of the candidate objects at a first moment before and adjacent to the current moment; and determining roads on which the candidate objects are located based on the locations of the candidate objects as well as map data.

4. The method according to claim 1, wherein determining the target vehicle on the first road based on locations of the vehicles on the first road as well as the target area comprises:

calculating target locations reached by the vehicles on the first road after the first predetermined time period based on the locations of the vehicles on the first road, the first predetermined time period and driving speed of the vehicles on the first road at the current moment; and determining the target vehicle among the vehicles on the first road based on distances between the target locations of the vehicles on the first road and the target area.

5. The method according to claim 1, wherein after determining the target area based on the location of the target object and before sending the early-warning message to the target vehicle, the method further comprises:

in case of the location of the target object is a junction location and color of traffic light of the first road is not a first predetermined color, or the location of the target object is not the junction location, generating the early-warning message based on the target object and the first predetermined time period.

6. The method according to claim 1, wherein the early-warning method is realized by a computer device.

7. An electronic device, comprising:

at least one processor; and a memory in communication with the at least one processor, wherein instructions which can be processed by the at least one processor are stored in the memory such that the at least one processor carries out an early-warning method, comprising:

determining a target object crossing a road at a current moment, the road crossed by the target object being a first road;

determining a target area based on a location of the target object;

determining a target vehicle on the first road based on locations of vehicles on the first road as well as the target area; and sending an early-warning message to the target vehicle, wherein the determining the target area based on the location of the target object comprises:

determining the target area corresponding to a first predetermined time period and having the location of the target object as a center of the target area, on the basis of the location of the target object, and wherein the determining the target vehicle on the first road based on locations of vehicles on the first road as well as the target area comprises:

determining the target vehicle out of respective vehicles on the first road and within the target area, on the basis of locations of the respective vehicles on the first road as well as the target area.

8. The electronic device according to claim 7, wherein determining the target object crossing the road at the current moment comprises:

determining a road on which candidate objects are located at the current moment as well as travelling directions of the candidate objects at the current moment; and determining the target object among the candidate objects based on angles between the travelling directions of the candidate objects and a direction of the road on which the candidate objects are located.

9. The electronic device according to claim 8, wherein determining the road on which the candidate objects are located at the current moment as well as travelling directions of the candidate objects at the current moment comprises:

acquiring a first location of a first candidate object at the current moment by means of a V2I communication between vehicles and the road, and acquiring a second location of a second candidate object by means of target detection;

acquiring locations of the candidate objects at the current moment by merging the first location of the first candidate object with the second location of the second candidate object;

calculating travelling directions of the candidate objects at the current moment based on the locations of the candidate objects at the current moment as well as locations of the candidate objects at a first moment before and adjacent to the current moment; and determining roads on which the candidate objects are located based on the locations of the candidate objects as well as map data.

10. The electronic device according to claim 7, wherein determining the target vehicle on the first road based on locations of the vehicles on the first road as well as the target area comprises:

calculating target locations reached by the vehicles on the first road after the first predetermined time period based on the locations of the vehicles on the first road, the first predetermined time period and driving speed of the vehicles on the first road at the current moment; and determining the target vehicle among the vehicles on the first road based on distances between the target locations of the vehicles on the first road and the target area.

11. The electronic device according to claim 7, wherein after determining the target area based on the location of the target object and before sending the early-warning message to the target vehicle, the method further comprises:

in case of the location of the target object is a junction location and color of traffic light of the first road is not a first predetermined color, or the location of the target object is not the junction location, generating the early-warning message based on the target object and the first predetermined time period.

12. The electronic device according to claim 7, wherein the electronic device is a computer device.

13. A non-transitory computer readable storage medium storing computer instructions, wherein the computer instructions are used for a computer to carry out an early-warning method, comprising:

determining a target object crossing a road at a current moment, the road crossed by the target object being a first road;

determining a target area based on a location of the target object;

determining a target vehicle on the first road based on locations of vehicles on the first road as well as the target area; and sending an early-warning message to the target vehicle, wherein the determining the target area based on the location of the target object comprises:

determining the target area corresponding to a first predetermined time period and having the location of the target object as a center of the target area, on the basis of the location of the target object, and wherein the determining the target vehicle on the first road based on locations of vehicles on the first road as well as the target area comprises:

determining the target vehicle out of respective vehicles on the first road and within the target area, on the basis of locations of the respective vehicles on the first road as well as the target area.

14. The non-transitory computer readable storage medium according to claim 13, wherein determining the target object crossing the road at the current moment comprises:

determining a road on which candidate objects are located at the current moment as well as travelling directions of the candidate objects at the current moment; and determining the target object among the candidate objects based on angles between the travelling directions of the candidate objects and a direction of the road on which the candidate objects are located.

15. The non-transitory computer readable storage medium according to claim 14, wherein determining the road on which the candidate objects are located at the current moment as well as travelling directions of the candidate objects at the current moment comprises:

acquiring a first location of a first candidate object at the current moment by means of a V2I communication between vehicles and the road, and acquiring a second location of a second candidate object by means of target detection;

acquiring locations of the candidate objects at the current moment by merging the first location of the first candidate object with the second location of the second candidate object;

calculating travelling directions of the candidate objects at the current moment based on the locations of the candidate objects at the current moment as well as locations of the candidate objects at a first moment before and adjacent to the current moment; and determining roads on which the candidate objects are located based on the locations of the candidate objects as well as map data.

16. The non-transitory computer readable storage medium according to claim 15, wherein determining the target vehicle on the first road based on locations of the vehicles on the first road as well as the target area comprises:

calculating target locations reached by the vehicles on the first road after the first predetermined time period based on the locations of the vehicles on the first road, the first predetermined time period and driving speed of the vehicles on the first road at the current moment; and determining the target vehicle among the vehicles on the first road based on distances between the target locations of the vehicles on the first road and the target area.

17. The non-transitory computer readable storage medium according to claim 13, wherein after determining the target area based on the location of the target object and before sending the early-warning message to the target vehicle, the method further comprises:

in case of the location of the target object is a junction location and color of traffic light of the first road is not a first predetermined color, or the location of the target object is not the junction location, generating the early-warning message based on the target object and the first predetermined time period.

* * * * *